United States Patent
Bauer et al.

(10) Patent No.: US 9,874,276 B2
(45) Date of Patent: Jan. 23, 2018

(54) AUTOMATIC TRANSMISSION WITH AN OPERATING ELEMENT

(71) Applicant: AUDI AG, Ingolstadt (DE)

(72) Inventors: Martin Bauer, Ingolstadt (DE);
Johann Eichler, Ingolstadt (DE);
Hennig Schmahl, Ingolstadt (DE); Iwo Heidrich, Eching (DE)

(73) Assignee: AUDI AG, Ingolstadt (DE)

( * ) Notice: Subject to any disclaimer, the term of this patent is extended or adjusted under 35 U.S.C. 154(b) by 664 days.

(21) Appl. No.: 14/384,963

(22) PCT Filed: Dec. 19, 2012

(86) PCT No.: PCT/EP2012/005244
§ 371 (c)(1),
(2) Date: Sep. 12, 2014

(87) PCT Pub. No.: WO2013/135261
PCT Pub. Date: Sep. 19, 2013

(65) Prior Publication Data
US 2015/0096398 A1   Apr. 9, 2015

(30) Foreign Application Priority Data

Mar. 13, 2012 (DE) ........................ 10 2012 005 236

(51) Int. Cl.
*F16H 59/02* (2006.01)
*F16H 59/12* (2006.01)
*F16H 61/12* (2010.01)

(52) U.S. Cl.
CPC ......... *F16H 59/0204* (2013.01); *F16H 59/12* (2013.01); *F16H 61/12* (2013.01);
(Continued)

(58) Field of Classification Search
None
See application file for complete search history.

(56) References Cited

U.S. PATENT DOCUMENTS 4,922,769 A * 5/1990 Tury .................. F16H 59/12
477/125
5,425,686 A   6/1995 Grange
(Continued)

FOREIGN PATENT DOCUMENTS

CN   101848821   9/2010
CN   102271952   12/2011
(Continued)

OTHER PUBLICATIONS

WIPO provided English translation of the International Preliminary Report on Patentability uploaded on the WIPO website on Sep. 13, 2014 for corresponding International Patent Application No. PCT/EP2012/005244.
(Continued)

*Primary Examiner* — Erin D Bishop
(74) *Attorney, Agent, or Firm* — Staas & Halsey LLP

(57) ABSTRACT

An automatic transmission having an operator control which has at least one manually actuable switching rocker which is arranged on a steering wheel. A sensor senses the actuation of the switching rocker and is connected via a signal path to a transmission control device of the automatic transmission. The switching rocker and the transmission control device are additionally connected to one another via a second signal path which is independent of the signal path.

20 Claims, 1 Drawing Sheet

(52) U.S. Cl.
CPC .............. *F16H 2059/0243* (2013.01); *F16H 2061/122* (2013.01); *F16H 2061/1268* (2013.01); *F16H 2061/1284* (2013.01); *Y10T 74/2003* (2015.01)

(56) References Cited

U.S. PATENT DOCUMENTS

| | | |
|---|---|---|
| 8,387,739 B2 | 3/2013 | Ishihara et al. |
| 2007/0204710 A1 | 9/2007 | Mandou et al. |
| 2011/0232408 A1 | 9/2011 | Rampf |

FOREIGN PATENT DOCUMENTS

| | | |
|---|---|---|
| DE | 692 03 397 T2 | 12/1995 |
| DE | 196 48 374 A1 | 6/1998 |
| DE | 100 18 661 A1 | 11/2001 |
| DE | 102 41 014 A1 | 3/2004 |
| DE | 102 60 168 A1 | 7/2004 |
| DE | 10 2012 005 236.7 | 3/2012 |
| EP | 0 844 128 A1 | 5/1998 |
| EP | 1 146 257 A2 | 10/2001 |
| EP | 2 101 086 A1 | 9/2009 |
| KR | 10-2007-0049728 | 5/2007 |
| WO | PCT/EP2012/005244 | 12/2012 |

OTHER PUBLICATIONS

Chinese Office Action for related Chinese Patent Application No. 201280071405.3, dated Jul. 21, 2015, 9 pages.
Search Report dated Sep. 10, 2012 for corresponding German Patent Application No. 10 2012 005 236.7.
International Search Report dated Feb. 25, 2013 in corresponding International Patent Application No. PCT/EP2012/005244.

\* cited by examiner

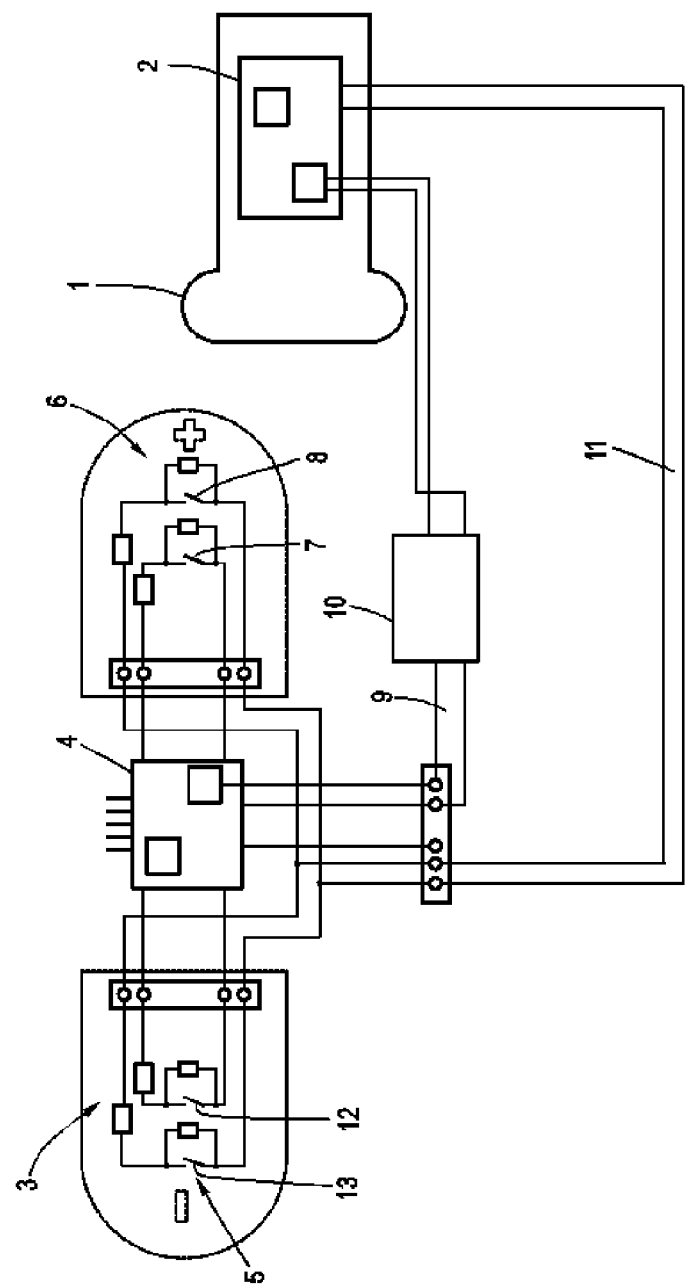

AUTOMATIC TRANSMISSION WITH AN OPERATING ELEMENT

CROSS REFERENCE TO RELATED APPLICATIONS

This application is based on and hereby claims priority to International Application No. PCT/EP2012/005244 filed on Dec. 19, 2012 and German Application No. 10 2012 005 236.7 filed on Mar. 13, 2012, the contents of which are hereby incorporated by reference.

BACKGROUND

The invention relates to an automatic transmission having an operator control which has at least one manually actuable switching rocker which is arranged on a steering wheel and which comprises a sensor for sensing the actuation and is connected via a signal path to a transmission control device of the automatic transmission.

Nowadays, in vehicles with an automatic transmission the drive position (P, R, N, D, M, S) which is selected by a driver is sensed electronically by a switching signal and is transmitted to the transmission control device via a data bus. This technology is referred to as shift-by-wire. In this context, vehicles with an automatic transmission generally have a steering wheel with at least one switching rocker in order to be able to switch gear stages manually. The switching rockers usually have a microswitch and the transmission of the signal to the transmission control device is not secured.

EP 2 101 086 A1 describes an operator control for an automatic transmission in which the selection of drive positions and gearspeeds is carried out by switching rockers on the steering wheel.

DE 102 41 014 A1 discloses an automatic transmission having an operator control, in which in the case of manual actuation of an operator control, information is transmitted to an electronic transmission controller via a bus system.

DE 100 18 661 A1 proposes an operator control for changing a drive position or gear stage of an automatic transmission, switching information being transmitted via a vehicle-specific bus system here.

Conventional automatic transmissions have the disadvantage that for safety reasons actuation of the switching rockers does not permit drive positions to be selected. For example, it would be desirable to change from the drive position or gear stage P, R, N directly to M by actuating a switching rocker, in order to switch on a manual forward movement program. Since such switching processes are categorized as safety-relevant functions, the selection of the drive position cannot be carried out by simple actuation of a switching rocker which is characterized by "+" or "−".

SUMMARY

One possible object therefore relates to specifying an automatic transmission having an operator control in which safety-relevant switching processes can be carried out by switching rockers.

The inventors propose an automatic transmission having an operator control which has at least one manually actuable switching rocker which is arranged on a steering wheel and which comprises a sensor for sensing the actuation, the sensor being connected via a signal path to a transmission control device of the automatic transmission. The inventors propose that the switching rocker and the transmission control device are additionally connected to one another via a second signal path which is independent of the signal path.

The proposal is based on the idea that conventional sensing and transmission of switching rocker signals can be extended with a second detection and transmission process which is independent thereof, with the result that safety-relevant functions can be carried out with the switching rockers. With the proposed automatic transmission it is possible to use the operator control to implement new functions which are prohibited with conventional automatic transmissions for reasons of safety. This includes the selection of drive positions or gear stages by actuating switching rockers on the steering wheel. For example, the gear stage N could be switched on by actuating both switching rockers on the steering wheel.

One variant proposes that the switching rocker has two sensors and each sensor is assigned a signal path. In this context, the second signal path can be a discrete signal path and the first, conventional signal path can be a component of a bus system.

With the automatic transmission it is preferred that the sensor, or a sensor, is embodied as a microswitch, a digital or analogue Hall sensor, a capacitive sensor, an inductive sensor or as a photoelectric barrier. Insofar as the switching rocker has two sensors, these may also be different sensors, for example a switching rocker can have a microswitch and additionally a capacitive sensor.

However, with the automatic transmission a variant is alternatively also possible, in which the switching rocker has a single sensor whose sensor signal is evaluated by two separate evaluation units.

The scope also includes the sensor being connected to an input of an evaluation unit via a resistance network.

In addition, the inventors propose a motor vehicle. The motor vehicle is defined by the fact that it has an automatic transmission having an operator control of the type described.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The drawing shows schematically one embodiment of a proposed automatic transmission having an operator control.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

An automatic transmission 1 is assigned a transmission control device 2. A multifunction steering wheel 3 comprises a control device 4 which is connected to two switching rockers 5, 6. Each switching rocker 5, 6 has two microswitches 7, 8 or 12, 13. Switching rockers 5, 6 are printed with the symbols "+" and "−", respectively, and accordingly when the section of the switching rocker 6 which is labeled with "+" is actuated, the switching contact of the microswitches 7 and 8 is closed, and when the section which is printed with "−" is actuated, the switching contact of the microswitches 12 and 13 is closed. The microswitches 7, 12 are connected via a resistance network to an analogue input of the control device 4 (evaluation unit) of the multifunction steering wheel 3, with the result that short circuits to positive or negative, disconnections or shunts can be detected. The control device 4 of the multifunction steering wheel 3 evaluates a switching signal and outputs via a data bus 9 a signal who plausibility is checked. The data bus 9 can have a gateway 10 and is connected to the transmission control device 2.

The pushbutton-key signal of the switching rockers 5, 6 is additionally detected by second microswitches 8, 13 whose switching point corresponds to that of the microswitches 7, 12. The second microswitches 8, 13 are directly and discretely connected via a resistance network and the cable harness 11 of the motor vehicle to the transmission control device 2. Short circuits to positive and negative, disconnections and shunts from the transmission control device 2 are detected by the resistance network, with the result that the plausibility of the raw signal transmitted via the cable harness 11 can be checked. The cable harness 11 of the motor vehicle therefore corresponds to a second signal path, with the result that switching signals are transmitted both via the data bus 9 and via the cable harness 11. Accordingly, switching signals of the microswitches 7, 12 are transmitted via the first signal path (data bus 9), and switching signals of the microswitches 8, 13 are transmitted via the second signal path (cable harness 11). Making two separate and independent signal paths available provides a redundancy. If the first signal path, i.e. the data bus 9, is used, the data transmission occurs via the multifunction steering wheel 3, and if the second signal path is used, the data transmission occurs via discrete lines, specifically the cable harness 11.

As a result of the two evaluation paths data bus 9 and cable harness 11, two completely independent signals are made available to the transmission control device 2, the plausibility of which signals can be in turn checked against one another. With this redundancy which is ensured over the entire signal chain it is possible to carry out safety-relevant functions:

If detection occurs via both signal paths "+" at the switching rocker 6, the drive position M is engaged, and this is also possible from the drive positions or gear stages P, R and N. On the other hand, if simultaneous actuation of both switching rockers 5 and 6 is detected via both signal paths, the gear stage N is engaged, provided that one of the drive positions or gear stages P, R, D, S or M was previously engaged.

The signal evaluation for the change of a gear can be restricted to the second signal path (cable harness 11) since the signals are present significantly more quickly by virtue of the discrete connection to the transmission control device 2, which connection has low transmission latency.

In other embodiments, instead of microswitches for sensing, it is also possible to use other sensors, for example digital or analogue Hall sensors, capacitive sensors, inductive sensors, photoelectric barriers or the like. Instead of two sensors per switching rocker it is possible to use a single sensor whose sensor signal is evaluated on two different paths of two different evaluation units. Instead of a resistance network it is also possible to use respectively a digital input provided in the multifunction steering wheel and/or transmission control device or an analogue input without resistance coding.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. An automatic transmission having an operator control element, comprising:
    a manually operated switching rocker provided on a steering wheel, the switching rocker comprising a sensor to sense actuation of the switching rocker;
    a first signal path to connect the sensor to a transmission control device of the automatic transmission, the first signal path being a data bus; and
    a second signal path independent of the first signal path, to connect the sensor to the transmission control device of the automatic transmission, the second signal path being a cable harness.

2. The automatic transmission as claimed in claim 1, wherein
    the sensor comprises first and second switches,
    the first signal path connects the first switch to the transmission control device, and
    the second signal path connects the second switch to the transmission control device.

3. The automatic transmission as claimed in claim 1, wherein
    the sensor to sense actuation of the switching rocker is a single sensor whose sensor signal is evaluated by two separate controllers.

4. The automatic transmission as claimed in claim 1, wherein
    the sensor to sense actuation of the switching rocker is a single sensor whose sensor signal is evaluated by separate first and second controllers, and
    the first and second controllers are connected to the first and second signal paths, respectively.

5. The automatic transmission as claimed in claim 1, wherein the sensor is embodied as a microswitch.

6. The automatic transmission as claimed in claim 1, wherein the sensor is embodied as at least one device selected from the group consisting of a digital Hall sensor, an analog Hall sensor, a capacitive sensor, an inductive sensor and a photoelectric barrier sensor.

7. The automatic transmission as claimed in claim 1, wherein the sensor is connected to an input of a controller via a resistance network.

8. The automatic transmission as claimed in claim 1, wherein
    a controller is provided in the steering wheel,
    the sensor is connected to an analog input of the controller, and
    the controller is connected to the data bus of the first signal path.

9. The automatic transmission as claimed in claim 1, wherein
    the manually operated switching rocker serves as a first functional switching rocker,
    the automatic transmission further comprises:
        a second functional switching rocker, the second functional switching rocker also being manually operated and also being provided on the steering wheel; and
        a second functional sensor to sense actuation of the second functional switching rocker,
    and
    the second functional sensor is connected to the transmission control device of the automatic transmission by both the first and second signal paths.

10. The automatic transmission as claimed in claim 9, wherein
the first functional switching rocker is provided on a first side of the steering wheel, and
the second functional switching rocker is provided on a second side of the steering wheel, opposite the first side of the steering wheel.

11. The automatic transmission as claimed in claim 10, wherein
the automatic transmission is a manual-automatic transmission,
the transmission is switched into manual forward mode if actuation of at least one of the switching rockers is detected via both the first and second signal paths,
the first functional switching rocker is associated with a positive transmission action, and
the second functional switching rocker is associated with a negative transmission action.

12. The automatic transmission as claimed in claim 11, wherein
the second signal path is an analog signal path, and
gears are shifted if actuation of one of the switching rockers is detected via only the second signal path.

13. The automatic transmission as claimed in claim 10, wherein
the transmission is switched into neutral if simultaneous actuation of both switching rockers is detected via both the first and second signal paths.

14. The automatic transmission as claimed in claim 1, wherein
the second signal path is an analog signal path.

15. A motor vehicle, comprising:
a steering wheel; and
an automatic transmission having an operator control element, comprising:
a manually operated switching rocker provided on a steering wheel, the switching rocker comprising a sensor to sense actuation of the switching rocker;
a first signal path to connect the sensor to a transmission control device of the automatic transmission, the first signal path being a data bus; and
a second signal path independent of the first signal path, to connect the sensor to the transmission control device of the automatic transmission, the second signal path being a cable harness.

16. The motor vehicle as claimed in claim 15, wherein
the sensor comprises first and second switches,
the first signal path connects the first switch to the transmission control device, and
the second signal path connects the second switch to the transmission control device.

17. The motor vehicle as claimed in claim 15, wherein
the sensor to sense actuation of the switching rocker is a single sensor whose sensor signal is evaluated by two separate controllers.

18. The motor vehicle as claimed in claim 15, wherein
the sensor to sense actuation of the switching rocker is a single sensor whose sensor signal is evaluated by separate first and second controllers, and
the first and second controllers are connected to the first and second signal paths, respectively.

19. The motor vehicle as claimed in claim 15, wherein the sensor is embodied as a microswitch.

20. The motor vehicle as claimed in claim 15, wherein the sensor is embodied as at least one device selected from the group consisting of a digital Hall sensor, an analog Hall sensor, a capacitive sensor, an inductive sensor and a photoelectric barrier sensor.

* * * * *